(12) United States Patent
Chen et al.

(10) Patent No.: US 7,282,070 B2
(45) Date of Patent: Oct. 16, 2007

(54) REACTIVE DYE COMPOSITION AND THE USE THEREOF

(75) Inventors: Wen-Jang Chen, Jhongli (TW); Chien-Yu Chen, Lujhu Township, Taoyuan County (TW); Bao-Kun Lai, Guanyin Township, Taoyuan County (TW); Ya-Chi Tseng, Pingjen (TW)

(73) Assignee: Everlight USA, Inc., Pineville, NC (US)

( * ) Notice: Subject to any disclaimer, the term of this patent is extended or adjusted under 35 U.S.C. 154(b) by 0 days.

(21) Appl. No.: 11/252,708

(22) Filed: Oct. 19, 2005

(65) Prior Publication Data

US 2006/0254002 A1 Nov. 16, 2006

(30) Foreign Application Priority Data

May 10, 2005 (CN) .................. 2005 1 0700993

(51) Int. Cl.
C09B 62/008 (2006.01)
(52) U.S. Cl. .............. 8/667; 8/642; 8/673; 8/682; 8/696
(58) Field of Classification Search .......... 8/549, 8/641, 667, 642, 673, 682, 696
See application file for complete search history.

(56) References Cited

U.S. PATENT DOCUMENTS 4,667,022 A * 5/1987 Nakamatsu et al. ........ 534/638

FOREIGN PATENT DOCUMENTS

| JP | 57141455 | | 9/1982 |
|---|---|---|---|
| JP | 04370157 | * | 12/1992 |
| JP | 11-335576 | * | 12/1999 |
| JP | 2000-44830 | * | 2/2000 |
| PL | 162424 | | 8/1989 |
| WO | 2004/061022 | * | 7/2004 |

OTHER PUBLICATIONS

Translation of JP 2000-44830 Feb. 2000.*
Translation of JP 11-335576 Dec. 1999.*
Wang et al. Coloration technology, 118(2002), pp. 159-168.*

* cited by examiner

*Primary Examiner*—Lorna M. Douyon
*Assistant Examiner*—Amina Khan
(74) *Attorney, Agent, or Firm*—Bacon & Thomas PLLC

(57) ABSTRACT

A reactive dye composition having satisfactory reproducibility, leveling, washing off and toughness under balanced affinity and reactivity, and improving Right First Time success ratio, for dyeing a cellulose fiber or fiber materials containing the cellulose fiber. The reactive dye composition comprising:
(a) at least one reactive red dyestuff selected from the group consisting of the following formulas, the component (a) is present in an amount ranging from 1% to 99% by weight, and
(b) at least one yellow reactive dyestuff selected from the group consisting of the following Color Index: C.I. Reactive Yellow 145 and C.I. Reactive Yellow 176, and at least one blue reactive dyestuff selected from the group consisting of the following Color Index: C.I. Reactive Blue 194, C.I. Reactive Blue 221 and C.I. Reactive Blue 222, the component (b) is present in an amount ranging from 99% to 1% by weight.

4 Claims, No Drawings

REACTIVE DYE COMPOSITION AND THE USE THEREOF

BACKGROUND OF THE INVENTION

1. Field of the Invention

The present invention relates to reactive dye compositions suitable for dyeing cellulose fiber or its blends and the use thereof, which comprises using at least one reactive red dyestuff having the amido group.

2. Description of the Related Art

Reactive dyestuffs are commonly used for dyeing cotton yarn, artificial fibers and other cellulose fibers. As known by most, when dyeing cellulose fibers with reactive dyestuffs, it is much satisfying to dye with trichromatic combination of red, yellow, and blue reactive dyestuffs in varying ratios.

However the application development of reactive dyestuffs at present is aiming for Right First Time, but the dyestuffs used in trichromatic combination each has dissimilar affinity, reactivity, dyeing rate and temperature dependence, and existing problems such as leveling where stains are formed in the process of dyeing, or reproducibility where slight changes in dyeing conditions may result in color difference between dyeing batches. Regarding to the leveling or reproducibility, with the growth in varieties and forms of fiber materials in recent years as well as the automation of the dyeing plants where the process is simplified for a shorter dyeing time, it is also strongly hoping for reactive dyestuffs having better leveling or reproducibility.

According to an interesting embodiment, at least one red reactive dye having specific structure to be used together with the yellow and/or blue reactive dye having specific structures, the dichromatic or trichromatic combinations are possessed with affinity and consist dyeing rate, as well the dyeing method allows cellulose fibers to have good leveling and reproducibility where the object of the present invention is met.

SUMMARY OF THE INVENTION

The present invention provides a reactive dye composition and the applications for dyeing and printing the said reactive dye composition. The reactive dye composition of the present invention has superior reproducibility, washing off and fine leveling and high fastness, and improves Right First Time success ratio, for dyeing a cellulose fiber or fiber materials containing the cellulose fiber.

The reactive dye composition of the present invention comprising:

(a) at least one reactive red dyestuff having an amido group of the following formula (1) present in an amount ranging from 1% to 99% by weight,

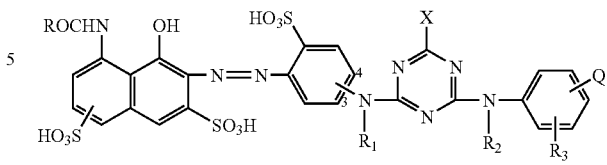

wherein
  R is $C_{1-4}$ alkyl unsubstituted or substituted by hydroxyl, sulfo, carboxyl or halogen atom, or a phenyl unsubstituted or substituted by hydroxyl, sulfo, carboxyl or halogen atom;
  $R_1$ and $R_2$ each independently is hydrogen, or $C_{1-4}$ alkyl unsubstituted or substituted by hydroxyl, sulfo, carboxyl or cyano;
  $R_3$ is hydrogen, sulfo, $C_{1-4}$ alkyl or $C_{1-4}$ alkoxyl;
  X is a halogen atom, $-OR_4$,

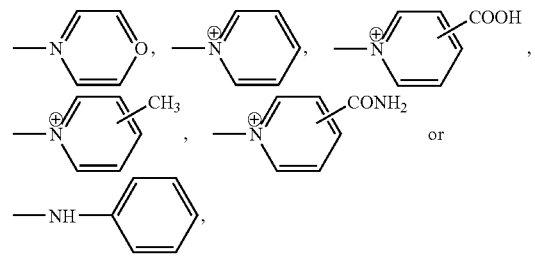

wherein $R_4$ is hydrogen or $C_{1-4}$ alkyl; Q is $-SO_2-Y$, $-CONH-(CH_2)_n-SO_2-Y$, $-(O)_o-(CH_2)_m-CONH-(CH_2)_n-SO_2-Y$ or $-NH-CO-T$, wherein Y is $-CH=CH_2$ or $-CH_2-CH_2-U$, wherein U is a leaving group which is elimiable by a base, T is α,β-halopropionyl or α-haloacryloyl, n and m are each independently of one another an integer of 1 to 6, o is 0, 1, 2, or 3; and (b) at least one yellow reactive dyestuff selected from the group consisting of the following Color Index: C.I. Reactive Yellow 145 and C.I. Reactive Yellow 176, and/or at least one blue reactive dyestuff selected from the group consisting of the following Color Index: C.I. Reactive Blue 194, C.I. Reactive Blue 221 and C.I. Reactive Blue 222, the dyestuff is present in an amount ranging from 99% to 1% by weight.

The component (a) of the reactive dye composition of the present invention is preferably present in an amount ranging from 1% to 80% by weight relative to total weight of said composition, and said component, and component (b) is preferably present in an amount ranging from 99% to 20% by weight relative to total weight of said composition.

The reactive dye composition of the present invention, wherein reactive red dyestuff of formula (1) preferably is the following compound of formula (1a):

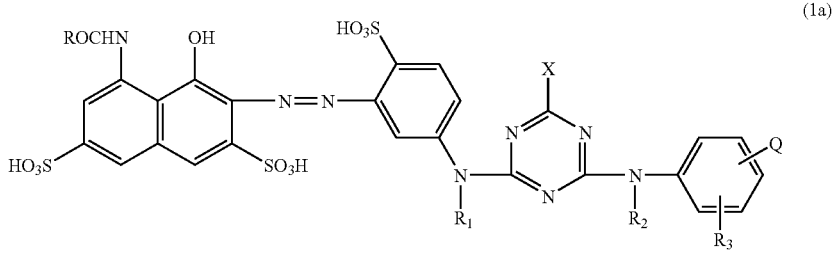

wherein R, $R_1$, $R_2$, $R_3$, X and Q are defined the same as the aforementioned red reactive dyestuff of formula (1). More preferably the red reactive dyestuff of formula (1) is the compound of formula (1b):

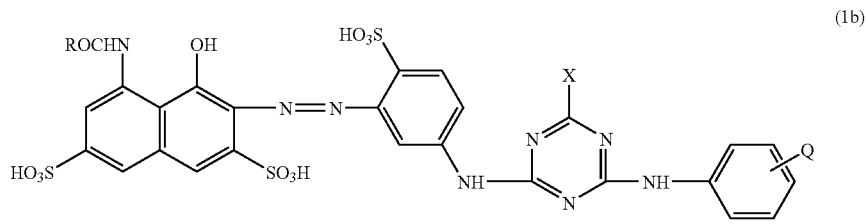

(1b)

wherein R, X and Q are defined the same as the aforementioned red reactive dyestuff of formula (1). Wherein concrete examples of the compound of formula (1b) are the following compounds of formula (2) to (6).

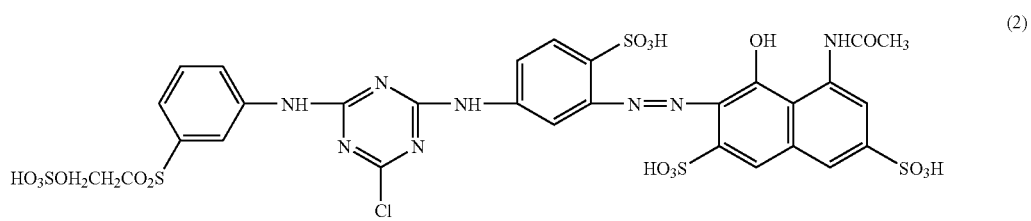

(2)

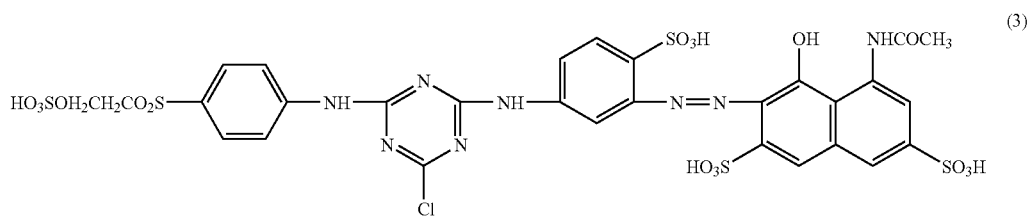

(3)

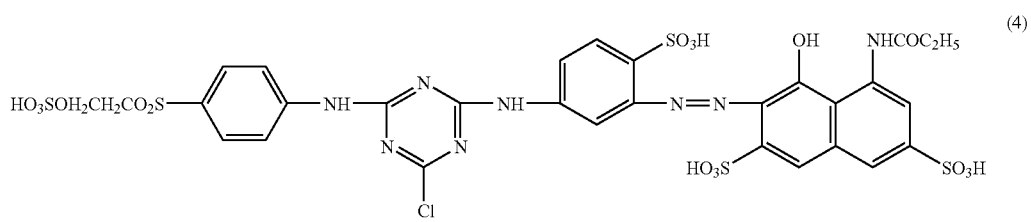

(4)

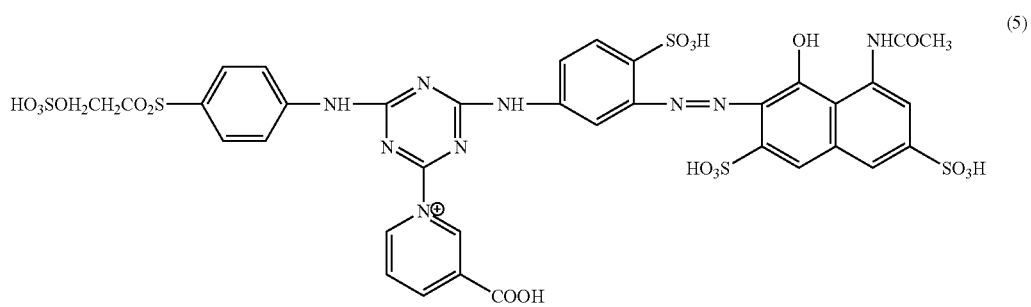

(5)

-continued

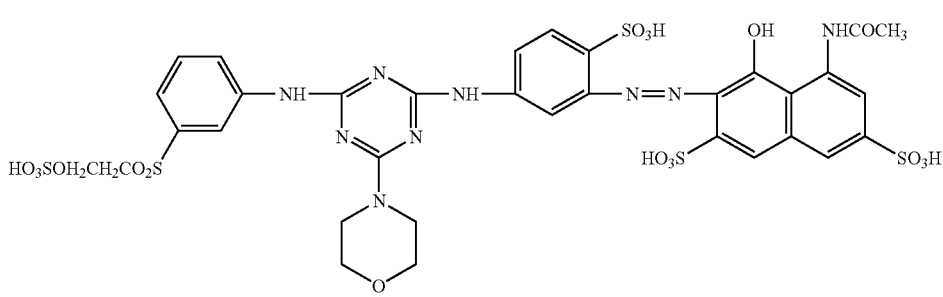

The reactive dyes of the present invention can be presented in the form of acids or salts, particularly in the form of alkali metal and alkali earth metal, application wise preferably it is in the form of alkaline metallic salt.

The present invention also provides a method for dyeing or printing cellulose fibers, which comprises of using an aqueous solution of the reactive dye composition contained the formula (1) reactive dyestuff to dye fiber materials, wherein an example of cellulose fiber materials is cotton.

DETAILED DESCRIPTION OF THE PREFERRED EMBODIMENT

The preparation of the formula (1) reactive dyestuff in the reactive dye composition of the present invention can be reference in the disclosed European Patent Number 36,582 and U.S. Pat. No. 4,667,022, and can be exemplified in the following synthesis for preparing the reactive dyestuff of formula (1).

The preparation of is as follows, where the amino compound of formula (A) and the trihalogen triazine compound of formula (B) below are proceeded with condensation reaction under acidic to neutral pH (pH=3-7) in

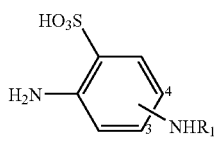

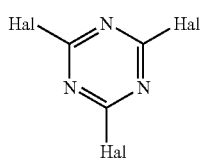

a low temperature of 0-10° C., wherein $R_1$ is defined the same as the aforementioned reactive dye of formula (1), Hal is a halogen such as fluorine, chlorine, or bromine atom. Subsequently the reacting solution further undergoes condensation reaction with the following amino compound of formula (C) under weak acidic to basic pH such as a pH between 5.0 to 9.0 in a temperature of 20~60° C., (C)

wherein $R_2$, $R_3$ and Q are defined the same as the aforementioned reactive dyestuff of formula (1), follow up it further undergoes condensation reaction with the compound of the following formula (D)

H—X    (D)

under acidic pH such as a pH between 3~6 in a temperature of 60~100° C. to obtain the compound of the following formula (E), wherein the X defined here is the same as the X defined in the aforementioned reactive dyestuff of formula (1).

(E)

Lastly the compound of formula (E) under a temperature range of −10 to 20° C. is proceeded with diazotization, after along with the naphthol compound of formula (F) shown below coupling reaction is carried out under a temperature of −10 to 50° C., preferably 0 to 30° C., and the pH is controlled between 1 to 7, preferably between 1 to 5 to prepare the reactive dyestuff of formula (1), (F)

wherein R, $R_1$, $R_2$, $R_3$, X and Q are defined the same as the aforementioned reactive dyestuff of formula (1).

As for the red reactive dyestuff in the form of formula (1), it is not necessary to limitation, but the dye is prefer to be in the form of dissolved acid of the following formula (2) to (6).

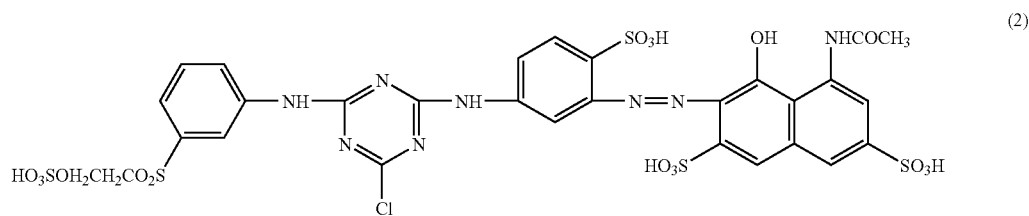
(2)
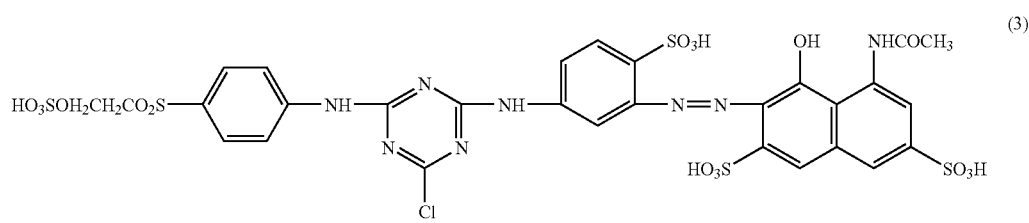
(3)
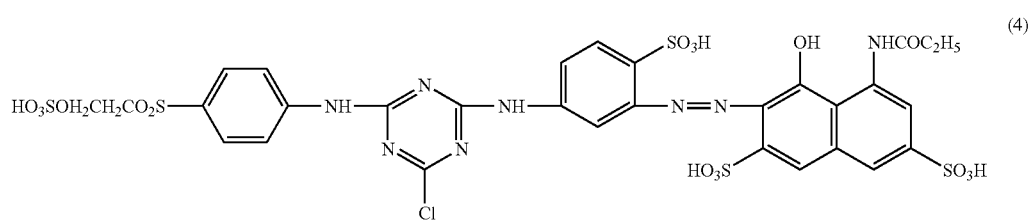
(4)
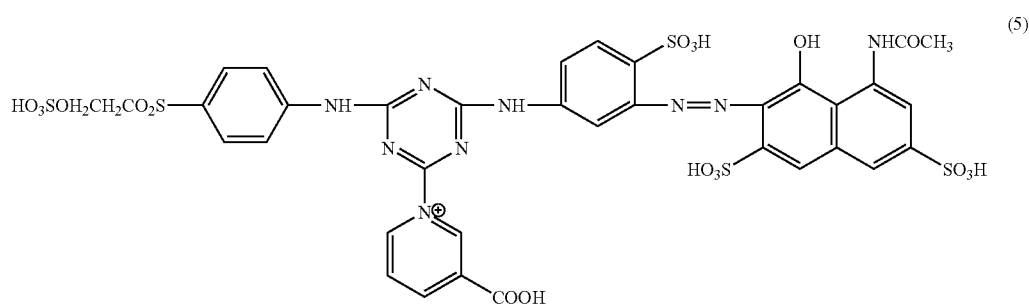
(5)
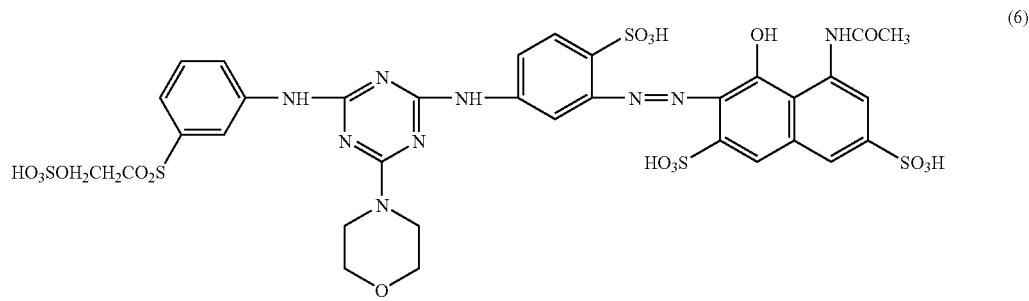
(6)

The reactive dye composition of the present invention, the mentioned yellow reactive dyestuff and/or blue reactive dyestuff of component (b) are marketed products and the products of Taiwan Everlight Chemical Industrial Co., Ltd are used.

With respect to the total weight of the dye composition of the present invention, the component (a) is presenting in an amount ranging from 1 to 99 weight percent, and the component (b) is presenting in an amount ranging from 99 to 1 weight percent. Wherein preferably component (a) is presenting in an amount ranging from 1 to 80 weight percent, and component (b) is presenting in an amount ranging from 99 to 20 weight percent.

In the dye composition of the present invention, the method of the dyestuff component adding is not to limitation. For example, one can use separately prepared dye components and mixing in after and then adding the reacting solution during the process, and dried after for the composition. Other than the above, in a dye bath the dyes can be dissolved together where the composition in the dye bath is prepared the same as the aforementioned composition. At the moment the mixing ratio of red reactive dye and yellow reactive dye and/or blue reactive dye depends on the color hoping to obtain and is not to any limitations. If needed the dye can comprise further additives, for example wetting agent, dispersing agents, leveling agents, precipitation inhibitors, metal ion locked agents, reductions inhibitors; or well known dyeing-assistants etc.

When applied the reactive dye composition of the invention in dyeing liquids, exhaust dyeing liquids, or printing pastes, the order for dissolving dyestuffs and additives is not critical. The amount of each component used may be determined by the aforementioned methods.

For convenience in the statement, the compounds are expressed as free acid in the specification. When the dyestuffs of the present invention are mass manufactured, or used, they often exist in the form of salts, especially alkaline metallic salts, such as sodium salts, lithium salts, potassium salts or ammonium salts, and preferably sodium salts.

The dye composition of the present invention can dye many kinds of fiber materials such as cellulose fiber materials and cellulose included fiber materials. These dye compositions can also be used to dye natural cellulose fibers and regenerated cellulose fibers, such as cotton, linen, jute, ramie, mucilage rayon, as well as cellulose based fibers.

In the present invention the dyeing methods are known to the public, it is preceded by usual or known methods such as the following methods.

Exhaustion dyeing is applied by using well known inorganic salts (e.g. anhydrous sodium sulfate and sodium chloride) and well-known alkali-binding agents (e.g. sodium carbonate, sodium hydroxide) independently or together. The amount of inorganic salts and alkali here is not important. Inorganic salts and alkali can be added into the dyeing bath through traditional methods either by once or by several times. In addition, dyeing assistants such as leveling agents, retarding agents etc. may be added as well. The range of dyeing temperature is from 40° C. to 90° C. Preferably, the temperature for dyeing is from 50° C. to 70° C. The usual dyeing ratio is 1:5~1:50 (substrate:dye liquid).

In the cold batch-up dyeing method, the substrates are padded with known inorganic neutral salts (e.g. anhydrous sodium sulfate and sodium chloride) and known acid-binding agents (e.g. sodium silicate and sodium hydroxide), then under room temperature the obtained substrate is rolled and batched.

Continuous dyeing can be divided into two different methods. In the single batch-up dyeing, known alkali-binding agents (e.g. sodium carbonate or sodium bicarbonate) are mixed with pad-dyeing liquor and under customary approach the substrate is padded, the padded substrate is then dye fixed by either baking or steam. In the two batch-up dyeing, the substrate is padded through a dye solution bath, with known inorganic neutral salts (e.g. anhydrous sodium sulfate and sodium chloride) and known alkali-binding agents (e.g. sodium hydroxide or sodium silicate) the substrate is processed, then under customary approach it is dye fixed by either baking or steam.

In the textile printing methods, there can be exemplified a method called single-phase printing method which conducts printing a substrate with a printing paste containing a known alkali-binding agent (e.g. sodium bicarbonate), and completing the dye fixation by dry heat or steam. In double-phase printing method, the method includes printing a substrate with a printing paste, and immersing the obtained substrate in a solution having inorganic neutral salt (e.g. sodium chloride) and known alkali-binding agents (e.g. sodium hydroxide or sodium silicate) under elevated temperature (90° C. or above) for dye fix. The dyeing or printing methods employed in the present invention are not limited to these methods.

The dye compositions of the present invention exhibit satisfactory reproducibility, leveling, washing off and fastness properties with good affinity, reactivity, and compatibility for dyeing cellulose fiber or its blends. Besides, the Right First Time success ratio is improved while having high fixation yield and washing off.

Many examples have been used to illustrate the present invention. The examples sited below should not be taken as a limit to the scope of the invention. In the general formulas, the compounds are represented in the form of dissolved acid. However, in practice, they will exist as alkali salts for mixing and salts for dyeing.

In the following examples, quantities are given as parts by weight (%) if there is no indication. The relationship between weight parts and volume parts are the same as that between kilogram and liter.

EXAMPLE 1

Providing the Following Dye Compositions:

| | |
|---|---|
| Red reactive dyestuff Dyestuff of formula (2) | 0.03 parts |
| Yellow reactive dyestuff C.I. Reactive Yellow 145 | 0.03 parts |
| Blue reactive dyestuff C.I. Reactive Blue 221 | 0.14 parts |

The above dye compositions are dissolved in 1000 parts of water, and 20 parts of Glauber's salt and 100 parts of unmercerized cotton cloth are added subsequently, under room temperature the dyeing liquid is stirred and heated for 30 minutes until a temperature of 60° C. is reached. After that, 10 parts of soda ash are then added, and dyeing is carried out for an hour while maintaining the temperature at 60° C. In the process of dyeing, samples are taken regularly, where fabric having same grayish color tone demonstrates good compatibility; after dyeing completion, dyed cloth is water cleaned, soaping off, and tumbled-dried to obtain a light grey fabric with excellent leveling.

EXAMPLE 2

Providing the Following Dye Compositions:

| | |
|---|---|
| Red reactive dyestuff Dyestuff of formula (3) | 0.2 parts |
| Yellow reactive dyestuff C.I. Reactive Yellow 176 | 0.2 parts |
| Blue reactive dyestuff C.I. Reactive Blue 221 | 0.28 parts |

The above dye compositions are dissolved in 1000 parts of water, and 30 parts of Glauber's salt and 100 parts of unmercerized cotton cloth are added subsequently, under a constant temperature of 60° C. the dyeing liquid is stirred and heated for 30 minutes. After that, 15 parts of soda ash are then added, and dyeing is carried out for an hour while maintaining the temperature at 60° C. After dyeing completion, dyed cloth is water cleaned, soaping off, and tumbled-dried to obtain a light brown fabric. The dyeing procedures are repeated several times, among the obtained fabrics the ΔC and ΔH are compared and are within the range of 0.5 which demonstrates high reproducibility and Right First Time ratio greater than 90%.

EXAMPLE 3

Providing the Following Dye Compositions:

| | |
|---|---|
| Red reactive dyestuff Dyestuff of formula (2) | 0.2 parts |
| Yellow reactive dyestuff C.I. Reactive Yellow 145 | 0.2 parts |
| Blue reactive dyestuff C.I. Reactive Blue 194 | 0.28 parts |

The above dye compositions are dissolved in 1000 parts of water, and 30 parts of Glauber's salt and 100 parts of unmercerized cotton cloth are added subsequently, under room temperature the dyeing liquid is stirred and heated for 30 minutes until a temperature of 60° C. is reached. After that, 15 parts of soda ash are then added, and dyeing is carried out for an hour while maintaining the temperature at 60° C. After dyeing completion, the dyed cloth is water cleaned, soaping off, and tumbled-dried to obtain a fabric with good reproducibility, leveling, and Right First Time. The dye compositions consist of high fixation yield, easy wash off of unfixed region, fine wet-fastness.

EXAMPLE 4

Providing the Following Dye Compositions:

| | |
|---|---|
| Red reactive dyestuff Dyestuff of formula (3) | 0.2 parts |
| Yellow reactive dyestuff C.I. Reactive Yellow 176 | 0.2 parts |
| Blue reactive dyestuff C.I. Reactive Blue 222 | 0.28 parts |

The above dye compositions are dissolved in 1000 parts of water, and 30 parts of Glauber's salt and 100 parts of unmercerized cotton cloth are added subsequently, under room temperature the dyeing liquid is stirred and heated for 30 minutes until a temperature of 60° C. is reached. After that, 15 parts of soda ash are then added, and dyeing is carried out for an hour while maintaining the temperature at 60° C. After dyeing completion, the dyed cloth is water cleaned, soaping off, and tumbled-dried to obtain a fabric with good reproducibility, leveling, and Right First Time. The dye compositions consist of high fixation yield, easy wash off of unfixed region, fine wet-fastness.

EXAMPLE 5

Providing the Following Dye Compositions:

| | |
|---|---|
| Red reactive dyestuff Dyestuff of formula (4) | 0.4 parts |
| Yellow reactive dyestuff | 0.3 parts |

[Chemical structure: a naphthalene ring bearing $SO_3H$, $HO_3S$, and $SO_3H$ substituents, connected via $-N=N-$ to a phenyl ring (with $NHCOCH_3$ substituent), then $-NH-$ to a chloro-triazine ring (with Cl substituent), then $-NH-$ to a phenyl ring bearing $-SO_2CH=CH_2$]

| | |
|---|---|
| Blue reactive dyestuff C.I. Reactive Blue 221 | 0.3 parts |

The above dye compositions are dissolved in 1000 parts of water, and 30 parts of Glauber's salt and 100 parts of unmercerized cotton cloth are added subsequently, under room temperature the dyeing liquid is stirred and heated for 30 minutes until a temperature of 60° C. is reached. After that, 15 parts of soda ash are then added, and dyeing is carried out for an hour while maintaining the temperature at 60° C. After dyeing completion, the dyed cloth is water cleaned, soaping off, and tumbled-dried to obtain a fabric with good reproducibility, leveling, and Right First Time. The dye compositions consist of high fixation yield, easy wash off of unfixed region, fine wet-fastness.

EXAMPLE 6

Providing the Following Dye Compositions:

| | |
|---|---|
| Red reactive dyestuff Dyestuff of formula (5) | 0.3 parts |
| Yellow reactive dyestuff C.I. Reactive Yellow 176 | 0.4 parts |
| Blue reactive dyestuff C.I. Reactive Blue 221 | 0.3 parts |

The above dye compositions are dissolved in 1000 parts of water, and 30 parts of Glauber's salt and 100 parts of unmercerized cotton cloth are added subsequently, under room temperature the dyeing liquid is stirred and heated for 30 minutes until a temperature of 60° C. is reached. After that, 15 parts of soda ash are then added, and dyeing is carried out for an hour while maintaining the temperature at 60° C. After dyeing completion, the dyed cloth is water cleaned, soaping off, and tumbled-dried to obtain a fabric with good reproducibility, leveling, and Right First Time. The dye compositions consist of high fixation yield, easy wash off of unfixed region, fine wet-fastness.

EXAMPLE 7

Providing the Following Dye Compositions:

| | |
|---|---|
| Red reactive dyestuff Dyestuff of formula (6) | 0.3 parts |
| Yellow reactive dyestuff C.I. Reactive Yellow 176 | 0.4 parts |
| Blue reactive dyestuff C.I. Reactive Blue 221 | 0.3 parts |

The above dye compositions are dissolved in 1000 parts of water, and 30 parts of Glauber's salt and 100 parts of unmercerized cotton cloth are added subsequently, under room temperature the dyeing liquid is stirred and heated for 30 minutes until a temperature of 60° C. is reached. After that, 15 parts of soda ash are then added, and dyeing is carried out for an hour while maintaining the temperature at 60° C. After dyeing completion, the dyed cloth is water cleaned, soaping off, and tumbled-dried to obtain a fabric with good reproducibility, leveling, and Right First Time. The dye compositions consist of high fixation yield, easy wash off of unfixed region, fine wet-fastness.

COMPARATIVE EXAMPLE 1

Providing the Following Dye Compositions:

| | |
|---|---|
| Red reactive dyestuff | 0.03 parts |

| | |
|---|---|
| Yellow reactive dyestuff C.I. Reactive Yellow 145 | 0.03 parts |
| Blue reactive dyestuff C.I. Reactive Blue 221 | 0.14 parts |

The above dye compositions are dissolved in 1000 parts of water, and 20 parts of Glauber's salt and 100 parts of unmercerized cotton cloth are added subsequently, under room temperature the dyeing liquid is stirred and heated for 30 minutes until a temperature of 60° C. is reached. After that, 10 parts of soda ash are then added, and dyeing is carried out for an hour while maintaining the temperature at 60° C. In the process of dyeing, samples are taken regularly, when fabric gradually color change from yellowish green to grey it simply means to the fabric red dyestuff has poor tinctorial yield with respect to yellow or blue dyestuffs and compatibility is poor; after dyeing completion, it is water cleaned, soaping off, and tumbled-dried to obtain a light grey fabric having partial red striped stains and it is an indication of poor leveling.

COMPARATIVE EXAMPLE 2

Providing the Following Dye Compositions:

| | |
|---|---|
| Red reactive dyestuff | 0.2 parts |

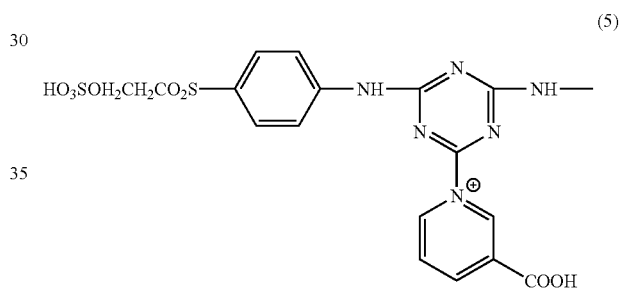

| | |
|---|---|
| Yellow reactive dyestuff<br>C.I. Reactive Yellow 176 | 0.2 parts |
| Blue reactive dyestuff<br>C.I. Reactive Blue 194 | 0.28 parts |

The above dye compositions are dissolved in 1000 parts of water, and 30 parts of Glauber's salt and 100 parts of unmercerized cotton cloth are added subsequently, the dyeing liquid is stirred and heated for 30 minutes while maintaining the temperature at 60° C. After that, 15 parts of soda ash are then added, and dyeing is carried out for an hour while maintaining the temperature at 60° C. After dyeing completion, the dyed cloth is water cleaned, soaping off, and tumbled-dried to obtain a light brown fabric. The dyeing procedures are repeated several times, among the obtained fabrics the $\Delta C$ and $\Delta H$ are compared and are greater than 1.0 which demonstrates poor reproducibility and Right First Time ratio less than 70%.

The series of dye compositions of the present invention are suitable for common use and can be used to dye cellulose fibers with excellent properties. The practiced dyeing methods are the common methods for dyeing reactive dyestuffs, examples of are exhaustion dyeing, printed-dyeing, or continuous dyeing.

The series of dye compositions described in the present invention are water-soluble dyestuffs having high commercial value. With the use of the dye compositions of the present invention, a reactive dye composition having satisfactory reproducibility, leveling, washing off and toughness under balanced affinity and reactivity, and improving Right First Time success ratio, for dyeing a cellulose fiber or fiber materials containing the cellulose fiber can be obtained.

From the foregoing description, one skilled in the art can easily ascertain the essential characteristics of this invention, and without departing from the scope thereof, one can make various changes and modifications of the invention to adapt it to various usages and conditions. Thus other embodiments are also within the claim.

What is claimed is:
1. A reactive dye composition comprising:
  (a) at least one reactive red dyestuff selected from the group consisting of the following formulas,

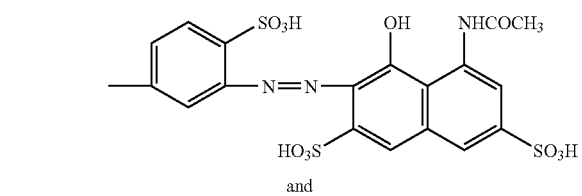

(5)

and

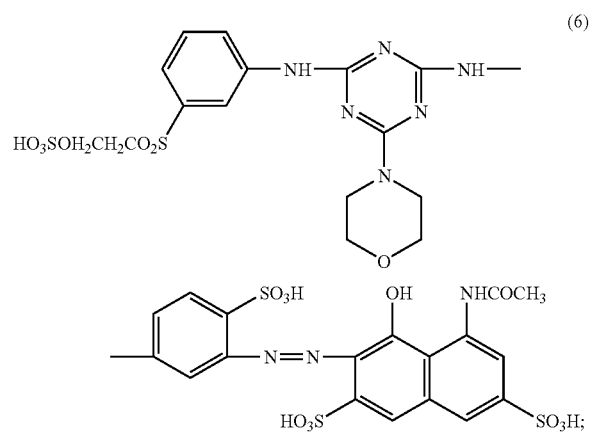

(6)

the component (a) is present in an amount ranging from 1% to 99% by weight, and (b) at least one yellow reactive dyestuff selected from the group consisting of the following Color Index: C.I. Reactive Yellow 145 and C.I. Reactive Yellow 176, and at least one blue reactive dyestuff selected from the group consisting of the following Color Index: C.I. Reactive Blue 194, C.I. Reactive Blue 221 and C.I. Reactive Blue 222, the component (b) is present in an amount ranging from 99% to 1% by weight.

2. The dye composition of claim 1, wherein said component (a) is present in an amount ranging from 1% to 80% by weight relative to total weight of said composition, and said component (b) is present in an amount ranging from 99% to 20% by weight relative to total weight of said composition.

3. The dye composition of claim 1, wherein the reactive red dye is the compound.

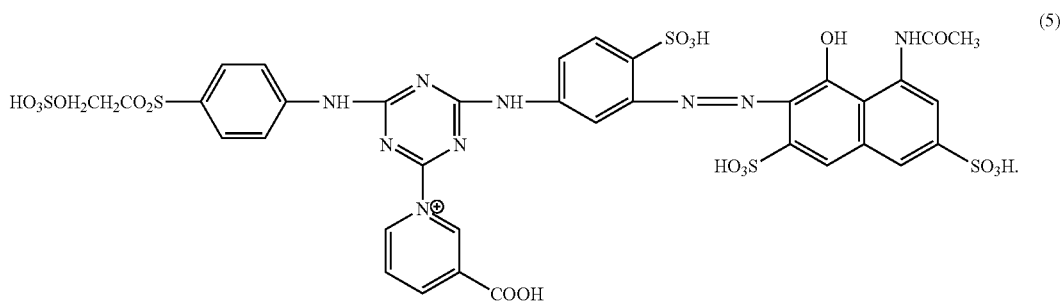

(5)

4. The dye composition of claim 1, wherein the reactive red dye is the compound.

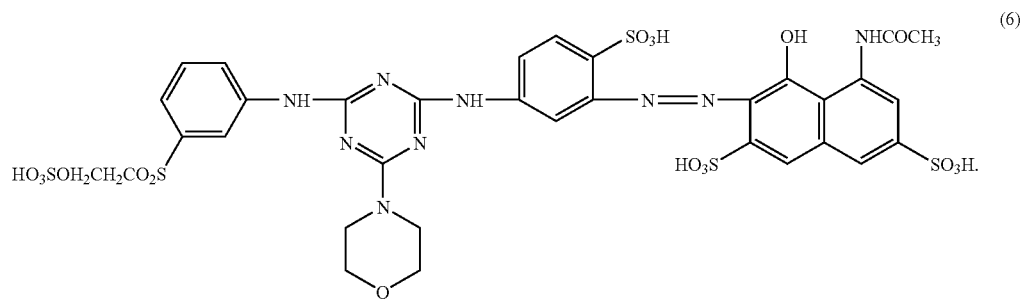

(6)

* * * * *